United States Patent [19]
Wolf

[11] Patent Number: 6,081,550
[45] Date of Patent: Jun. 27, 2000

[54] METHOD OF TESTING CLOCK PATHS AND NETWORK ELEMENTS FOR CARRYING OUT THE METHOD

[75] Inventor: Michael Wolf, Mundelsheim, Germany

[73] Assignee: Alcatel, Paris, France

[21] Appl. No.: 09/023,860

[22] Filed: Feb. 13, 1998

[30] Foreign Application Priority Data

Feb. 26, 1997 [DE] Germany ............................ 197 07 668
Jul. 16, 1997 [DE] Germany ............................ 197 30 438

[51] Int. Cl.⁷ ...................................................... H04B 3/46
[52] U.S. Cl. ........................... 375/224; 375/376; 370/248
[58] Field of Search ..................................... 375/354, 356, 375/376, 224, 222; 370/241, 248, 503

[56] References Cited

U.S. PATENT DOCUMENTS

| | | | |
|---|---|---|---|
| 4,881,243 | 11/1989 | Whitt ........................................ | 375/215 |
| 4,926,447 | 5/1990 | Corsetto et al. ......................... | 375/376 |
| 5,271,035 | 12/1993 | Cole et al. ............................... | 375/213 |
| 5,481,230 | 1/1996 | Chang et al. ............................ | 332/112 |
| 5,515,404 | 5/1996 | Pearce ...................................... | 375/371 |
| 5,627,500 | 5/1997 | Wolaver et al. ......................... | 332/112 |
| 5,943,382 | 8/1999 | Li et al. ................................... | 375/376 |

FOREIGN PATENT DOCUMENTS 9617278  6/1996  WIPO .
9631038 10/1996  WIPO .

OTHER PUBLICATIONS

"Measurement Tasks on SDH transmission systems" by R. Kiefer, 1993 ntz vol. 46, issue 2, pp. 92–96 (Article in German).

*Primary Examiner*—Stephen Chin
*Assistant Examiner*—Lenny Jiang
*Attorney, Agent, or Firm*—Ware, Fressola, Van der Sluys & Adolphson LLP

[57] ABSTRACT

The indicated test method makes it possible to test clock paths via which a reference clock is transmitted to synchronize network elements in a synchronous digital telecommunications system. To that end the reference clock is marked at the start of the clock path being tested by modulating information thereon. It is observed at the end of the clock path being tested whether the reference clock contains the information modulated thereon at the start. This information is configured so that it does not impair the operation of the synchronous digital telecommunications system. A network element is furthermore indicated, which is in a position to produce by itself the phase modulation required for a test, through its clock generator.

15 Claims, 4 Drawing Sheets

METHOD OF TESTING CLOCK PATHS AND NETWORK ELEMENTS FOR CARRYING OUT THE METHOD

TECHNICAL FIELD

The invention concerns a method of testing clock paths in a synchronous digital telecommunications system, and a network element for carrying out the method.

BACKGROUND OF THE INVENTION

When communications are transmitted in a synchronous digital telecommunications system, for example a SDH (Synchronous Digital Hierarchy) system or a SONET (Synchronous Optical Network) system, what essentially matters is that all network elements (e.g. add/drop multiplexers, cross-connects or line multiplexers) operate synchronously with each other. An article by R. Kiefer entitled "Measurement tasks on SDH transmission systems", 1993 ntz volume 46, issue 2, pages 92–96, describes that network elements are synchronized by means of a reference clock (designated as a 2 MHz central clock). It further describes that to simulate non-ideal reference clock responses, an analyzer can be switched between the reference clock source and the network element, to detune certain steps of the reference clock frequency. The network element reacts with pointer operations, which are documented by the analyzer to identify weak areas in the system's response. If the reference clock deviates too much, the network element switches over to an alternative synchronization.

However, the described method does not allow testing the connections through which a network element is provided with the reference clock, and with this method it is not possible to determine through which connections a network element receives the reference clock that is used for the synchronization.

SUMMARY OF THE INVENTION

One object of the invention is to present a method of testing clock paths in a synchronous digital telecommunications system, in the sense of testing the existence and the operation of connections through which a reference clock is distributed to network elements of the synchronous digital telecommunications system. Another object is to present a network element for carrying out the method.

The object is achieved by a method of testing clock paths in a synchronous digital telecommunications system, via which a reference clock is transmitted to synchronize network elements, so that at the start of the clock path to be tested, the reference clock is marked by modulating information thereon, the information is configured so that the operation of the synchronous digital telecommunications system is not impaired, and the reference clock is checked at the end of the clock path being tested to determine whether it contains the information modulated thereon at the start.

Another object is achieved by a network element of a synchronous digital telecommunications system, with a clock derivation circuit which can derive a reference clock from a received communication signal, having means for marking the reference clock, whereby information is added to the reference clock while a method of testing clock paths in the synchronous digital telecommunications system is taking place, wherein the reference clock is transmitted to synchronize network elements, so that at the start of the clock path to be tested, the reference clock is marked by modulating information thereon, the information is configured so that the operation of the synchronous digital telecommunications system is not impaired, and the reference clock is checked at the end of the clock path being tested to determine whether it contains the information modulated thereon at the start.

A still further object is achieved by a network element of a synchronous digital telecommunications system, with a clock derivation circuit that is able to derive a reference clock from a received communication signal, having means for testing whether the reference clock contains information modulated thereon while a method of testing clock paths in the synchronous digital telecommunications system is taking place, wherein the reference clock is transmitted to synchronize network elements, so that at the start of the clock path to be tested, the reference clock is marked by modulating information thereon, the information is configured so that the operation of the synchronous digital telecommunications system is not impaired, and the reference clock is checked at the end of the clock path being tested to determine whether it contains the information modulated thereon at the start.

The method of the invention has the advantage that it is possible to test the connections without impairing the operation of the telecommunications system, and that the configuration of the telecommunications system does not need to be changed when it is used for measurements.

BRIEF DESCRIPTION OF THE DRAWINGS

The invention is explained in the following by means of embodiments and the following figures, wherein.

BEST MODE FOR CARRYING OUT THE INVENTION

The network elements of a synchronous digital telecommunications system are synchronized with a reference clock which is distributed to all network elements. The reference clock is a pulse sequence with a 2 MHz pulse sequence frequency for example. Part of the distribution takes place via digital communication links, where the reference clock in the network element is recovered from received communication signals and any frequency fluctuations (jitter) are removed by low-pass filtering, and another part via clock lines between several network elements of a network node for example. In the following, the physical link between a reference clock source, for example a first network element which is synchronized with the reference clock, and a second network element is called a clock path.

It is desirable to test clock paths to ensure that all network elements of the synchronous digital telecommunications system receive the reference clock, that when one or several links or network elements fail, an alternative synchronization is switched on, i.e. that a network element which loses the link to its reference clock source selects another source as its reference clock source, and that no synchronization loops take place during the distribution of the reference clock, particularly when switching over to alternative synchronizations, i.e. that no two network elements use each other respectively as a reference clock source. In this sense the test of a clock path means testing the existence and the operation of a predetermined physical connection via which the reference clock is provided to a network element.

A basic idea of the invention for testing a clock path is to modulate information on the reference clock at the start of the clock path, and to observe this information at its end. If the information reaches the end of the clock path, the latter checks out. Another basic idea is to configure the modulated information in a way so that it is not eliminated by the low-pass filtering in clock derivation circuits of the network elements. In that case the modulated information must be configured so that it lies in the range of permissible phase and frequency fluctuations in order not to impair the operation of the telecommunications system during a test.

Figure 1A:
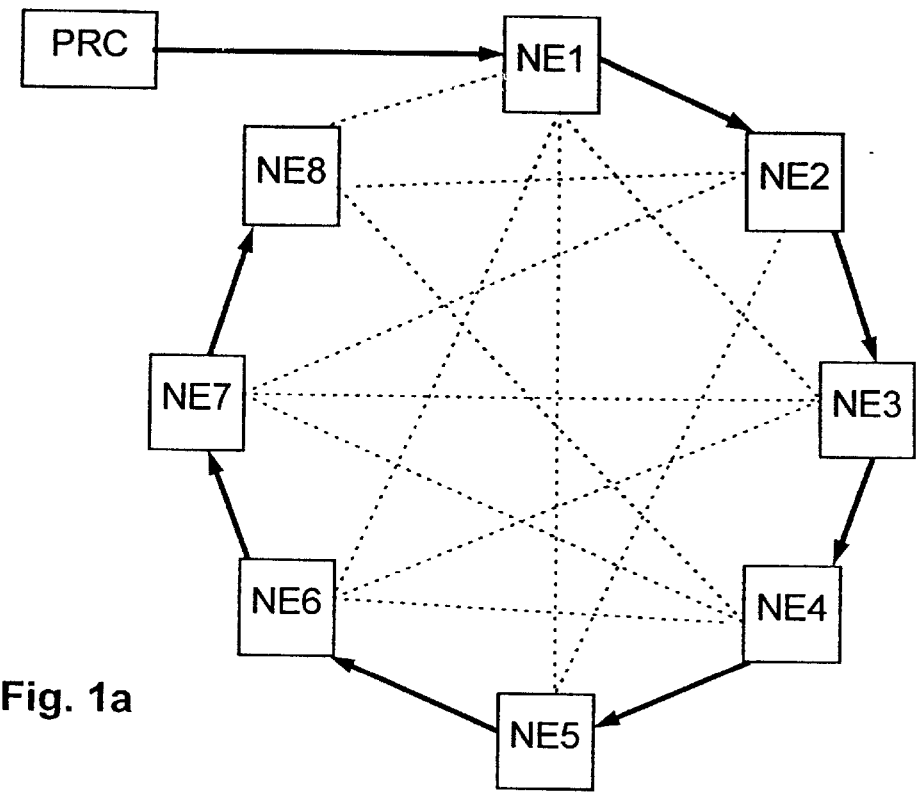
FIG. 1a is a synchronous digital telecommunications system with a drawn clock path (bold arrows)

In a first embodiment, the synchronous digital telecommunications system is a SDH system. This is illustrated in FIG. 1a. It comprises eight network elements NE1, . . . , NE8 arranged in a circle, which are also interconnected by numerous cross-connections. A central clock generator PRC (Primary Reference Clock) is also shown, from which the first network element NE1 receives a reference clock for synchronization. The clock path of the eighth network element is also drawn by bold arrows. As illustrated, the distribution of the reference clock takes place from the first network element NE1 via the other intermediately switched six network elements NE2, . . . , NE7 to the eighth network element NE8. There, each network element recovers the reference clock from the communication signal it receives from the preceding network element.

To test the drawn clock path from the first to the eighth network element in accordance with the method of the invention, the reference clock of the first network element is marked by modulating information on it. In the first embodiment this takes place in that the reference clock is phase modulated. This phase modulation has a frequency which is lower than the filter frequency, whereby the reference clock is filtered by the low-pass filters in the network elements NE1, . . . , NE8 to recover the clock. In this way the phase modulation propagates undisturbed through the intermediate network elements NE2, . . . , NE7 up to the network element NE8. If it is observed at the end of the clock path being tested that the reference clock of the eighth network element NE8 contains the phase modulation, it can be concluded that an intact clock path exists between the first and the eighth network element. For example the reference clock, which the eighth network element NE8 has derived from the seventh network element NE7, can be tested with a storage oscillograph or with a frequency analyzer. The clock path has been tested if the phase modulation is thereby proven.

Figure 1B:
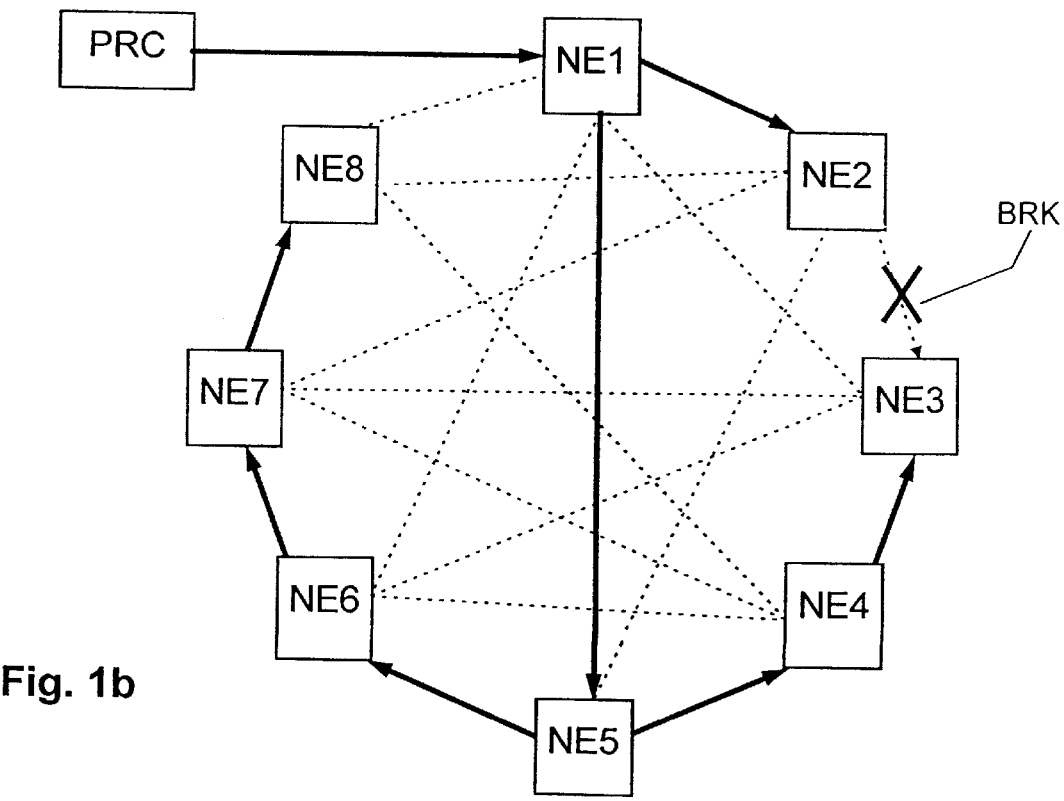
FIG. 1b is the telecommunications system in FIG. 1a with a different clock path as an alternative synchronization.

FIG. 1b illustrates the same SDH system, but the link between the second and the third network element NE2, NE3 is interrupted at BRK. The original clock path from the first to the eighth network element is therefore interrupted. This is noticed by the concerned network elements NE3, . . . , NE8, which have been cut off from their reference clock source. The network element NE5 switches over to an alternative synchronization by deriving its reference clock from the communication signal received via the connection to the first network element NE1. The network elements NE6, . . . , NE8 now have a reference clock source again, and the fourth and third network element NE3 also switch over to an alternative synchronization by synchronizing themselves with the fifth or fourth network element NE5, NE4, as illustrated in FIG. 1b.

The test method of the invention can now again be used in this constellation. The phase of the reference clock is modulated in the first network element NE1. The phase modulation can be observed in the eighth network element NE8, but also in all the other network elements NE2, . . . , NE7, which verifies that the eighth NE8 and also all the other network elements NE2, . . . , NE7 have a functioning clock path to the first network element. By knowing about the interruption BRK, it can also be concluded that the alternative synchronization of the concerned network elements is functioning.

Figure 1C:
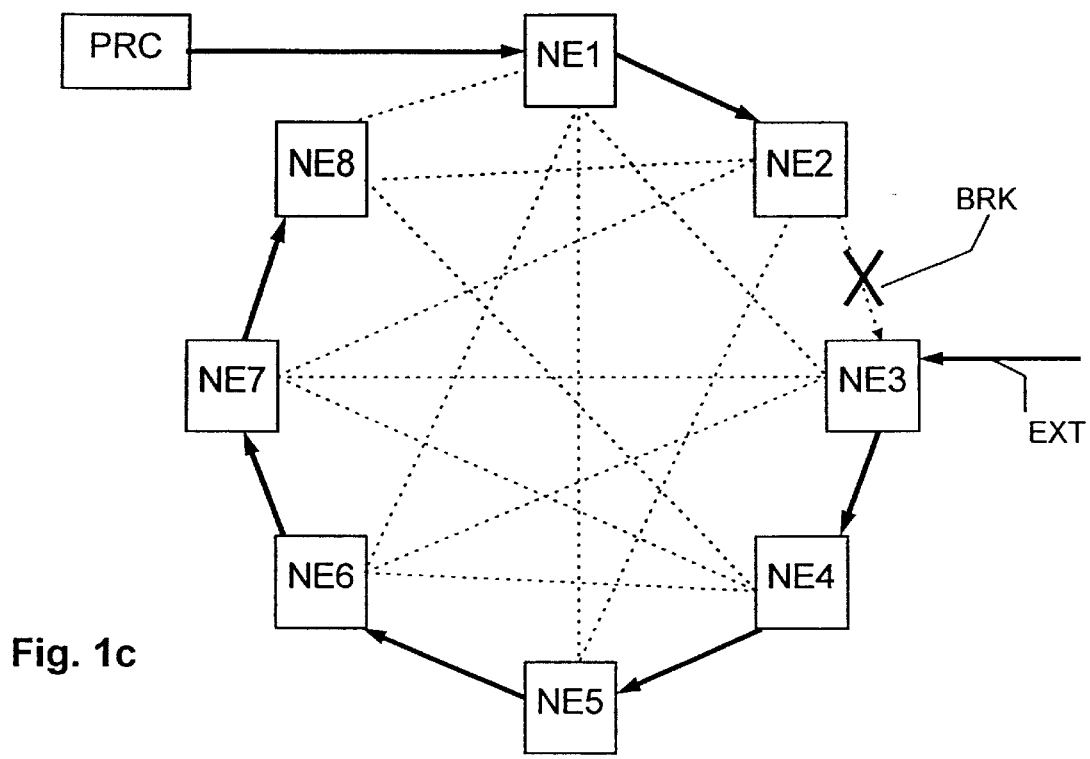
FIG. 1c is the telecommunications system in FIG. 1a with a clock path from an external reference clock source as the alternative synchronization.

Things are different with the constellation illustrated in FIG. 1c. After the interruption BRK has occurred, the third network element NE3, after determining the cessation of its reference clock source, has switched over to another alternative synchronization. It now uses an external reference clock source EXT. This may either be a not illustrated further network element, or a second central clock generator (Primary Reference Clock). In both cases the other network elements NE4, . . . , NE8 are again correctly synchronized, thus they have no need to switch over to an alternative synchronization.

If the test method of the invention is used for this constellation, and the reference clock of the first network element NE1 is marked by modulating information thereon, the fact that the information does not reach the eighth network element NE8 proves that the clock path between the first and the eighth network element NE8 has been disturbed. Further investigations can now take place in accordance with the test method of the invention, which tests in steps whether the clock path is operative from the eighth to the seventh network element NE8, NE7, from the eighth to the sixth network element NE8, NE6, etc. To that end for example, first in the seventh, then in the sixth etc. network elements NE7, NE8, . . . the phase of the reference clock is modulated in steps, and this modulation is observed at the eighth network element NE8. If the clock path to the third network element NE3 has been tested, it can be determined for example by knowing about the interruption BRK, that an intentional alternative synchronization of the network element NE3 is functioning.

Figure 1D:
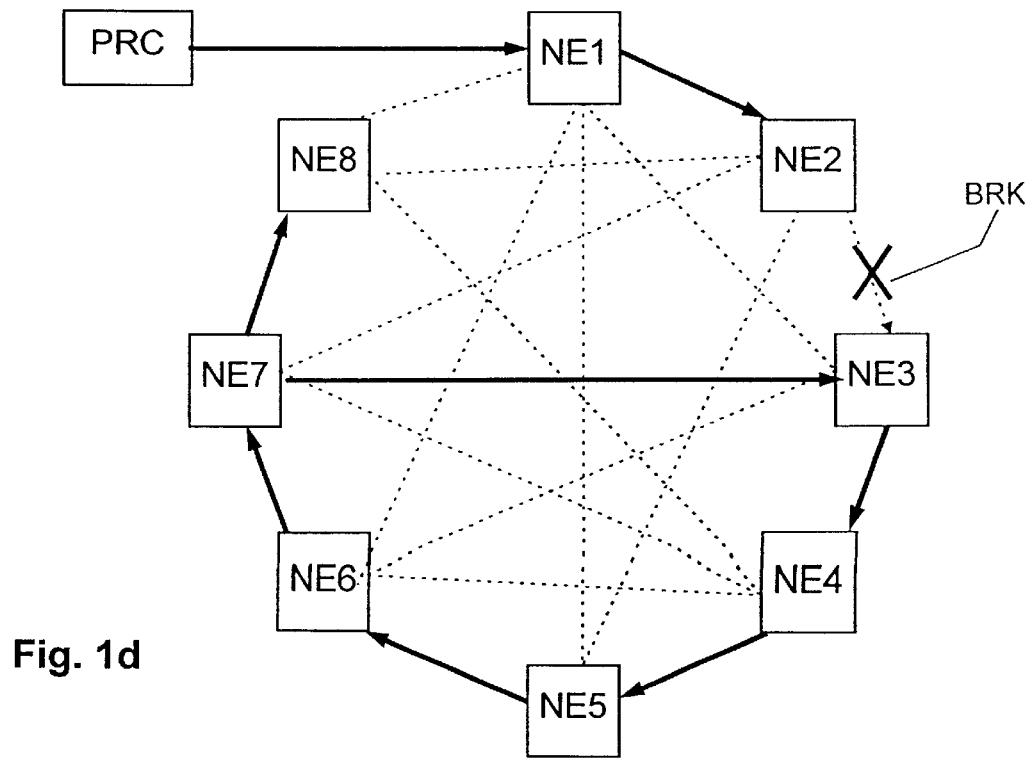
FIG. 1d is the telecommunications system in FIG. 1a with a defective clock path (synchronization loop)

FIG. 1d illustrates a defective configuration of the SDH system. After the interruption BRK has taken place, the network element NE3 has switched over to an alternative synchronization which in this instance is defective, and has derived its reference clock from the communication signal it received from the seventh network element NE7. This could happen if a preset possible alternative synchronization in the third network element NE3 is wrong, and the third network element NE3 registers the interruption BRK before the seventh network element NE7. In the present case a clock loop was formed, which must be avoided in every instance in a synchronous digital telecommunications system.

In this constellation the test of the clock path from the first to the eighth network element NE1, NE8 also shows that the clock path is interrupted. A further test can now take place in accordance with the method of the invention by phase modulating the reference clock in the third network element NE3. Because of the formation of the clock loop, the phase modulation which is not filtered out in the subsequent network elements NE4 to NE7, can be measured in the reference clock derived from the received signal in the third network element NE3. This demonstrates the existence of the clock loop and the defect can be corrected.

Figure 2:
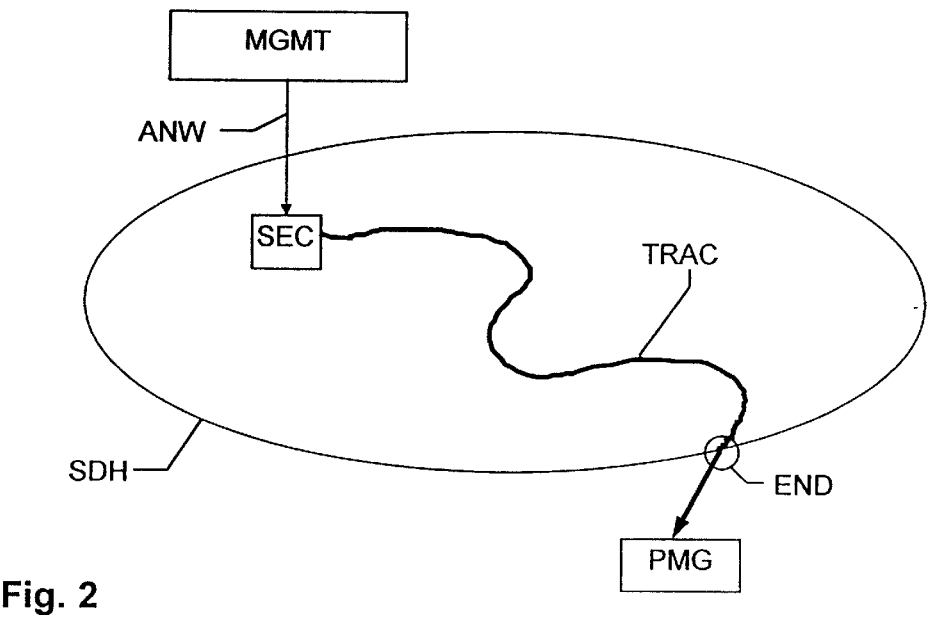
FIG. 2 is a schematic illustration of a telecommunications system while the method is being carried out.

FIG. 2 illustrates the arrangement of a second embodiment for a test method of the invention. A network management device MGMT of a synchronous digital telecommunications system SDH, in this case also a SDH system, transmits to a network element SEC the instruction to modulate the phase of its reference clock. The phase modulation is measured with a phase measuring instrument PMG in a certain place END of the SDH system. From the fact that the phase modulation occurs at END, it is again concluded that an intact clock path exists between the network element SEC and the point END which is thereby tested.

Figure 3:
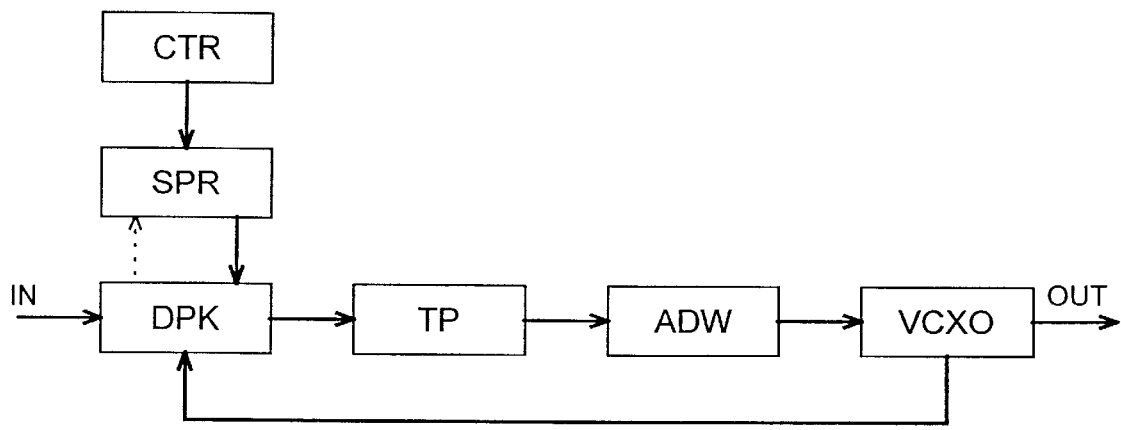
FIG. 3 is a clock derivation circuit of a network element.

FIG. 3 illustrates a clock derivation circuit for a network element, which is in a position to produce the phase modulation required to carry out the test method. It comprises a digital phase comparator DPK which compares the phase position of the signals located in its inputs, and as a function of this phase position generates a digital correction signal for a voltage-controlled quartz oscillator VCXO (Voltage-Controlled Crystal Oscillator). An external clock signal IN, for example the clock of a received communication signal, is located at one of the inputs of the digital phase comparator DPK. The other input is connected to the output of the voltage-controlled quartz oscillator VCXO. A digital low-pass TP is switched between the output of the digital phase comparator DPK and the control input of the voltage-controlled quartz oscillator VCXO, which is an integrator and minimizes the stationary phase error, and an analog/digital converter ADW, which produces a control voltage for the voltage-controlled quartz oscillator VCXO from the filtered digital correction signal. This control voltage is used to tune the voltage-controlled quartz oscillator VCXO to the external clock signal.

The digital phase comparator DPK has a control input that is connected to the nominal phase control system SPR. This nominal phase control system SPR is used to adjust a nominal phase between the external clock signal and the output signal of the voltage-controlled quartz oscillator VCXO in order to prevent transient oscillations or phase transients, for example when switching over to an alternative synchronization. To that end a connection has been drawn with a dotted line from the digital phase comparator DPK to the nominal phase control system SPR, via which large phase jumps are registered by the nominal phase control system SPR, and in such a case the nominal phase is adjusted anew.

The nominal phase control system SPR is connected to a controller CTR. In the event of a test according to the test method of the invention, this controller CTR causes the nominal phase control system to periodically change the nominal phase between an upper and a lower value. This produces a phase modulation of the reference clock and has the special advantage that none of the existing connections needs to be disrupted so that an additional (generator) device can be switched in to produce the phase modulation. The disruption of a connection would change the configuration of the telecommunications system, because in the meantime an alternative synchronization would have to be switched on to ensure that the clock is provided to the respective network elements. The measurement itself has also been very much simplified.

In order not to impair the operation of the SDH system, the modulation swings, i.e. the difference between the average value of the nominal phase and the upper or lower value, must be in the range of plus or minus 125 ns. This value is applied in particular when the phase modulation is produced by a network element of the level 3 hierarchy plane stratum. Such network elements are called an SDH equipment clock (SEC). In the event the phase modulation is produced by a so-called secondary clock provision of the level 2 hierarchy plane stratum, the modulation swing can also be around plus or minus 250 ns. Such secondary clock provisions are also called a SSU (Synchronization Supply Unit). Furthermore the duration of individual modulation swings should be in the range of 1 s to 1000 s, so that they are not eliminated by low-pass filtering in the network elements. The phase deviations are designed so that no unallowable phase noise is produced in the SDH system. The temporary frequency offsets as well remain under the 7.5 ppm value, which is critical for SDH network elements.

A modulation swing, i.e. a phase change from the average to the upper or lower value, means a binary + or − sign. A particularly advantageous variation of the test method is to modulate a binary coded character sequence (for example CMI-coded) instead of the +−+−+− . . . sequence. In spite of the extremely low transmission rate of 1 to 0.001 characters/s, information can be transmitted in this manner via the synchronization status of the network element at the start of the synchronization path for example. In this way it is also possible to perform independent parallel measurements, for example the simultaneous testing of several clock paths leading to different network elements. It is also advantageous to use a finite character sequence that is repeated periodically. This minimizes transmission errors. Such transmission errors can easily occur since the phase modulation is only slightly above the noise.

Another possibility of marking the reference clock at the start of a clock path to be tested could be to modulate the clock frequency.

Figure 4:
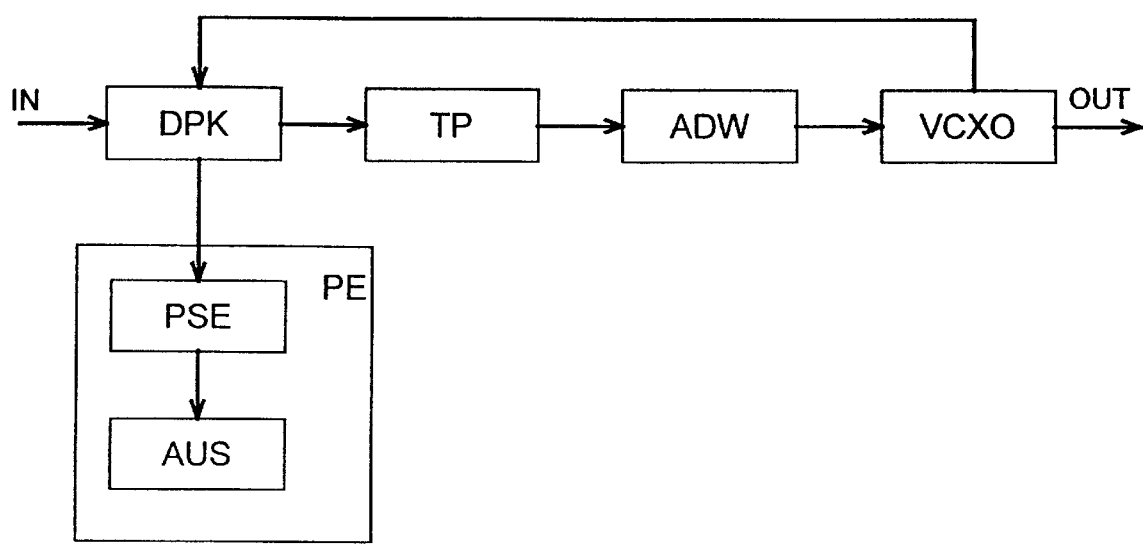
FIG. 4 is another clock deviation circuit and a testing device for a network element.

To carry out the method of the invention it is an advantage to be able to measure the information modulated on the clock directly in a network element without requiring another measuring instrument. Therefore a suitable network element contains means for checking during a test whether the reference clock contains the information modulated thereon. FIG. 4 illustrates a clock derivation circuit and a testing device PE for such a network element.

As in FIG. 3, the clock derivation circuit contains a voltage-controlled oscillator VCXO, an analog/digital converter ADW, a low-pass filter TP and a digitally operating phase comparator DPK. The phase comparator DPK compares the phase position of the input clock signal and the clock of the oscillator VCXO, and as a function of this phase position generates a correction signal, which is routed to the oscillator VCXO via the low-pass filter TP and the analog/digital converter ADW.

The digital phase comparator has another input which is connected to the testing device PE. At established time intervals, the phase comparator DPK periodically transmits via this connection the momentary phase measurement value, i.e. a value for the phase position between the input clock and the oscillator clock. The time interval can have a value of between 10 ms and 100 ms for example. The phase measurement values are routed to a device PSE for the recognition of phase jumps. This is followed by an evaluation unit AUS, which operates in accordance with known data generating methods. To that end a superposition of several cycles of the character sequence can be evaluated for example. This measure suppresses phase noise. The phase jump recognition and the evaluation can both be carried out with software.

In that case it is also particularly advantageous during the measurement to reduce the bandwidth of the clock derivation circuit, which is determined by the low-pass filter TP, to a suitable lower value so that the phase modulation produced during the measurement is not dampened in the clock derivation circuit of the received network element.

A correlation technique can be used to advantage to filter the test signals out of the phase noise. In this way the amplitude of the phase deviations produced for the measurement can be kept small, and the confidence that the phase modulation will be detected during the measurement is increased.

To detect the phase jumps that are produced during a measurement, it is also possible to evaluate the control signal for the voltage-controlled oscillator VCXO. In phase control circles which operate purely digitally, so-called PPLs (Phase-Locked Loops), this control signal is a digital signal. A purely digitally operating phase control loop is controlled by a processor. There it is possible to let the same processor perform the evaluation of the oscillator control signal required for the detection. This saves hardware components. The period of the modulation frequency that is produced during the measurement should be between 100 and 1000 s. In that case the load on the processor during the measurement remains small.

The control of the processor takes place by means of software. The following software registers are required to perform the measurement; they can be set or evaluated centrally for example by a management system, or directly in the respective network element:

| | |
|---|---|
| enable/disable the test function | 1 bit |
| send/receive | 1 bit |
| expected signal received/not received | 1 bit |
| confidence of reception exceeds threshold: yes/no | 1 bit |
| The following further software registers are advantageous for performing other functions: | |
| confidence of reception exceeds 2nd threshold. Yes/No | 1 bit |
| modulation frequency code | 2 bit |
| modulation amplitude code | 2 bit |

The last two software registers can be used to set and encode the frequency and amplitude of the phase modulation to enable the performance of independent parallel measurements.

The network element is preferably a cross-connect (CC) of the synchronous digital hierarchy (SDH), since it is located in the important switching centers for reference clocks, because of its significance for SDH networks.

What is claimed is:

1. A method of testing the integrity of clock paths in a synchronous digital telecommunications system containing a plurality of network elements, wherein each clock path contains more than two network elements and serving to transmit a reference clock to synchronize all of the network elements in the clock path, characterized in that at the start of the clock path to be tested, the reference clock is marked by modulating information thereon, the information is configured so that the operation of the synchronous digital telecommunications system is not impaired by the information, and the reference clock is checked at the end of the clock path being tested to determine whether it contains the information modulated thereon at the start and thereby verify the integrity of the clock path.

2. A method as claimed in claim 1, wherein the information comprises phase modulating the reference clock.

3. A method as claimed in claim 2, wherein the frequency of the phase modulation is lower than a filter frequency at which low-pass filters of network elements in the synchronous digital telecommunications system filter a received reference clock.

4. A method as claimed in claim 2, wherein the swing of the phase modulation is plus or minus 125 ns.

5. A method as claimed in claim 2, wherein the swing of the phase modulation is plus or minus 250 ns.

6. A method as claimed in claim 2, wherein the duration of the individual swing of the phase modulation has a predetermined magnitude in the range of 1 s to 1000 S.

7. A method as claimed in claim 2, wherein a binary coded character sequence of individual modulation swings is modulated on the phase of the reference clock.

8. A method as claimed in claim 7, wherein the character sequence is a finite sequence that is repeated periodically.

9. A method as claimed in claim 2 wherein, to test whether the reference clock contains the information modulated thereon at the start, a correlation technique is used to filter out the information from the noise.

10. A network element of a synchronous digital telecommunications system containing a plurality of network elements, the network element having a clock derivation circuit which can derive a reference clock from a received communication signal (IN), characterized by a controller (CTR) for marking the reference clock so that information is added to the reference clock by modulating the reference clock, wherein the modulated information can be used to test clock paths, wherein each clock path contains a plurality of network elements, wherein the controller modulates the reference clock with said information so that the operation of the synchronous digital telecommunications system is not impaired and so that the modulated information can pass through subsequent network elements so as to allow the reference clock to be checked at the end of the clock path by determining if the information modulated thereon is present, thereby verifying the integrity of the clock path.

11. A network element as claimed in claim 10, further wherein the clock derivation circuit comprises the following units:

a digitally operating phase comparator (DPK) for receiving the communication signal (IN), a nominal phase control system (SPR) which is connected to the phase comparator to adjust a desired phase, a digital low-pass filter (TP) which is connected to an output of the phase comparator (DPK), an analog/digital converter (ADW) which is connected to the output of the digital low-pass filter (TP), and a voltage-controlled quartz oscillator (VCXO) whose control input is connected to the output of the analog/digital converter (ADW), and wherein the controller (CTR) is connected to the nominal phase control system (SPR) and wherein the controller (CTR) periodically changes the desired phase between an upper and a lower value.

12. A network element of a synchronous digital telecommunications system containing a plurality of network elements, the network element having a clock derivation circuit which can derive a reference clock from a received communication signal (IN), characterized by a testing device (PE) communicating with the clock derivation circuit, the testing device to determine whether the reference clock contains information modulated thereon, wherein the modulated information can be used to test clock paths, wherein each clock path contains a plurality of network elements, wherein the modulated information does not impair the operation of the synchronous digital telecommunications system and so that the modulated information can pass through network elements so as to allow the reference clock to be checked at the end of the clock path by testing device testing whether the information modulated thereon is present, thereby verifying the integrity of the clock path.

13. A network element as claimed in claim 12, with a controllable oscillator in operative communication with the testing device, wherein the testing device evaluates a control signal from the controllable oscillator.

14. A network element as claimed in claim 13, with a digitally operating phase control loop to control the controllable oscillator, wherein the control signal for the controllable oscillator is produced by a processor, and this processor additionally evaluates the control signal for performing a test of the reference clock.

15. A network element as claimed in claim 12, further wherein the clock derivation circuit comprises the following units:

- a digitally operating phase comparator (DPK),
- a digital low-pass filter (TP) which is connected to an output of the phase comparator (DPK),
- an analog/digital converter (ADW) which is connected to the output of the digital low-pass filter (TP), and
- a voltage-controlled quartz oscillator (VCXO) whose control input is connected to the output of the analog/digital converter (ADW), and wherein the testing device (PE) is connected to the digital phase comparator (DPK) and regularly receives phase sampling values via this connection.

* * * * *

UNITED STATES PATENT AND TRADEMARK OFFICE
CERTIFICATE OF CORRECTION

PATENT NO.   : 6,081,550
DATED        : June 27, 2000
INVENTOR(S)  : Michael Wolf It is certified that error appears in the above-identified patent and that said Letters Patent is hereby corrected as shown below:

In column 8, line 14, claim 6, line 3, "1000 S" should be --1000 s--.

Signed and Sealed this

Twenty-fourth Day of April, 2001

Attest:

NICHOLAS P. GODICI

Attesting Officer    Acting Director of the United States Patent and Trademark Office